United States Patent [19]

Chong et al.

[11] B 3,983,219

[45] Sept. 28, 1976

[54] HIGH PURITY POLONIUM RECOVERY

[75] Inventors: Clyde H. H. Chong, Miamisburg; Calvin M. Love, Dayton; Martin D. Prisc, Bellbrook, all of Ohio; Alexander J. Russo, Milpitas, Calif.

[73] Assignee: The United States of America as represented by the United States Energy Research and Development Administration, Washington, D.C.

[22] Filed: Oct. 1, 1973

[21] Appl. No.: 402,553

[44] Published under the second Trial Voluntary Protest Program on February 17, 1976 as document No. B 402,553.

[52] U.S. Cl. .................................. 423/249; 423/2; 252/301.1 R
[51] Int. Cl.$^2$ .......................................... C01F 13/00
[58] Field of Search .............................. 423/2, 249; 252/301.1 R

[56] References Cited
UNITED STATES PATENTS

| | | | |
|---|---|---|---|
| 2,873,170 | 2/1959 | Hyde et al. | 423/2 |
| 2,894,817 | 7/1959 | Karraker | 423/2 |
| 3,758,663 | 9/1973 | Kirby | 423/2 |

*Primary Examiner*—Stephen J. Lechert, Jr.
*Attorney, Agent, or Firm*—Dean S. Carlson; Dudley W. King; Ignacio Resendez

[57] ABSTRACT

Apparatus and method for providing larger quantities of higher purity polonium suitable, as vapor distilled, for heat source elements for radioisotopic generators or the like.

4 Claims, 6 Drawing Figures

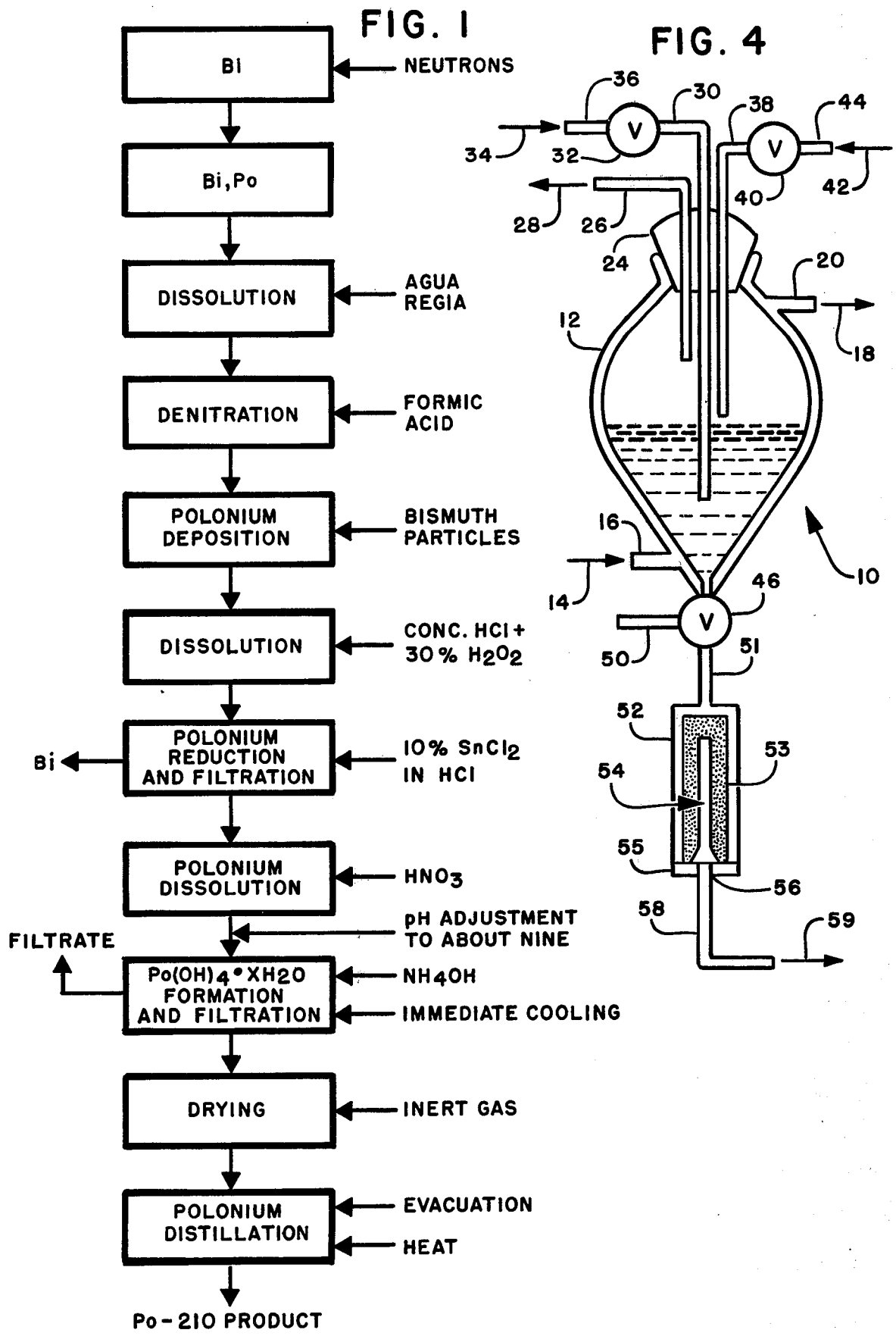

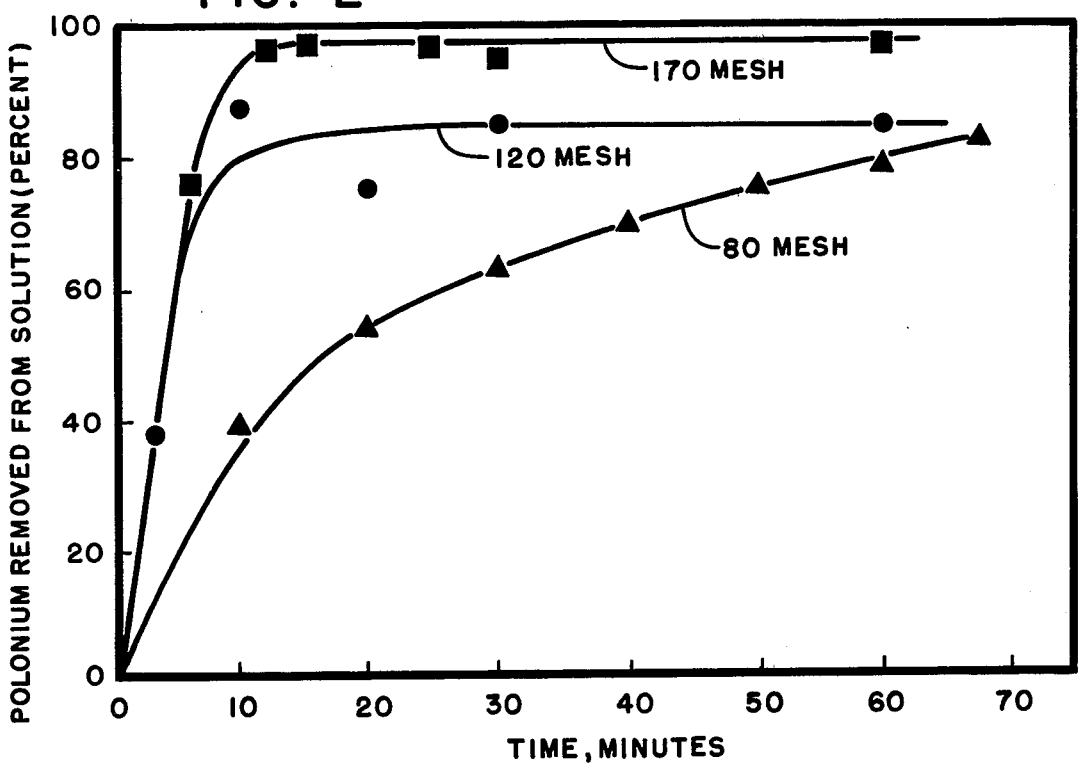
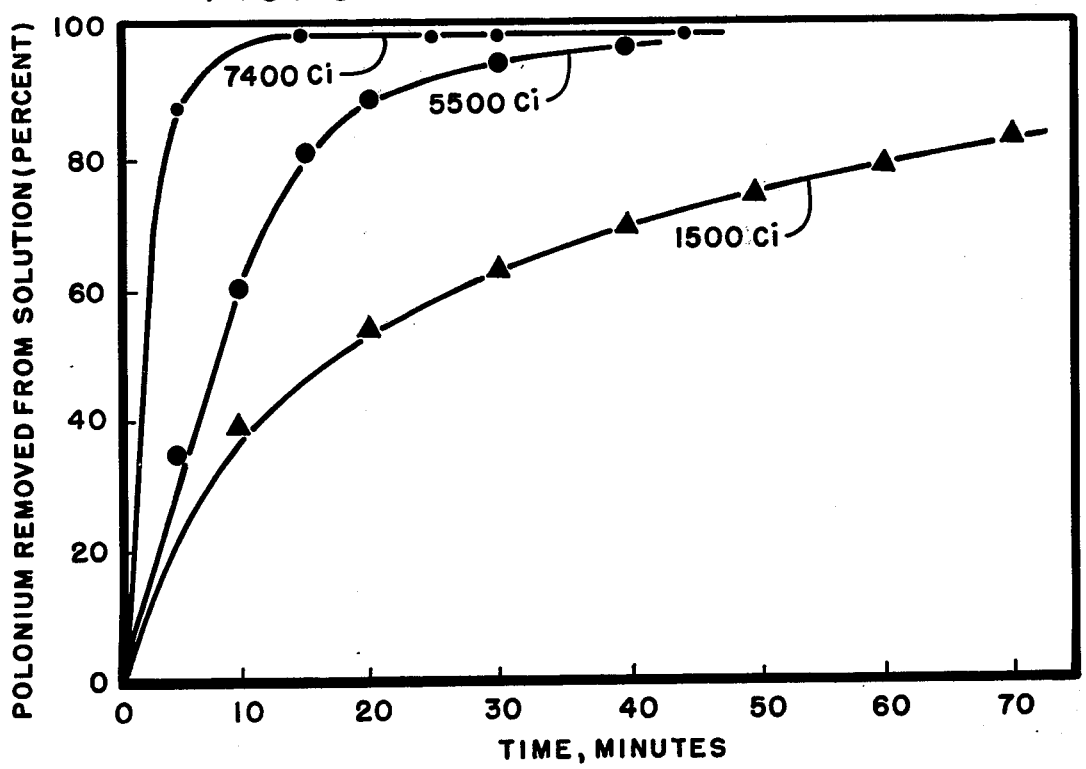

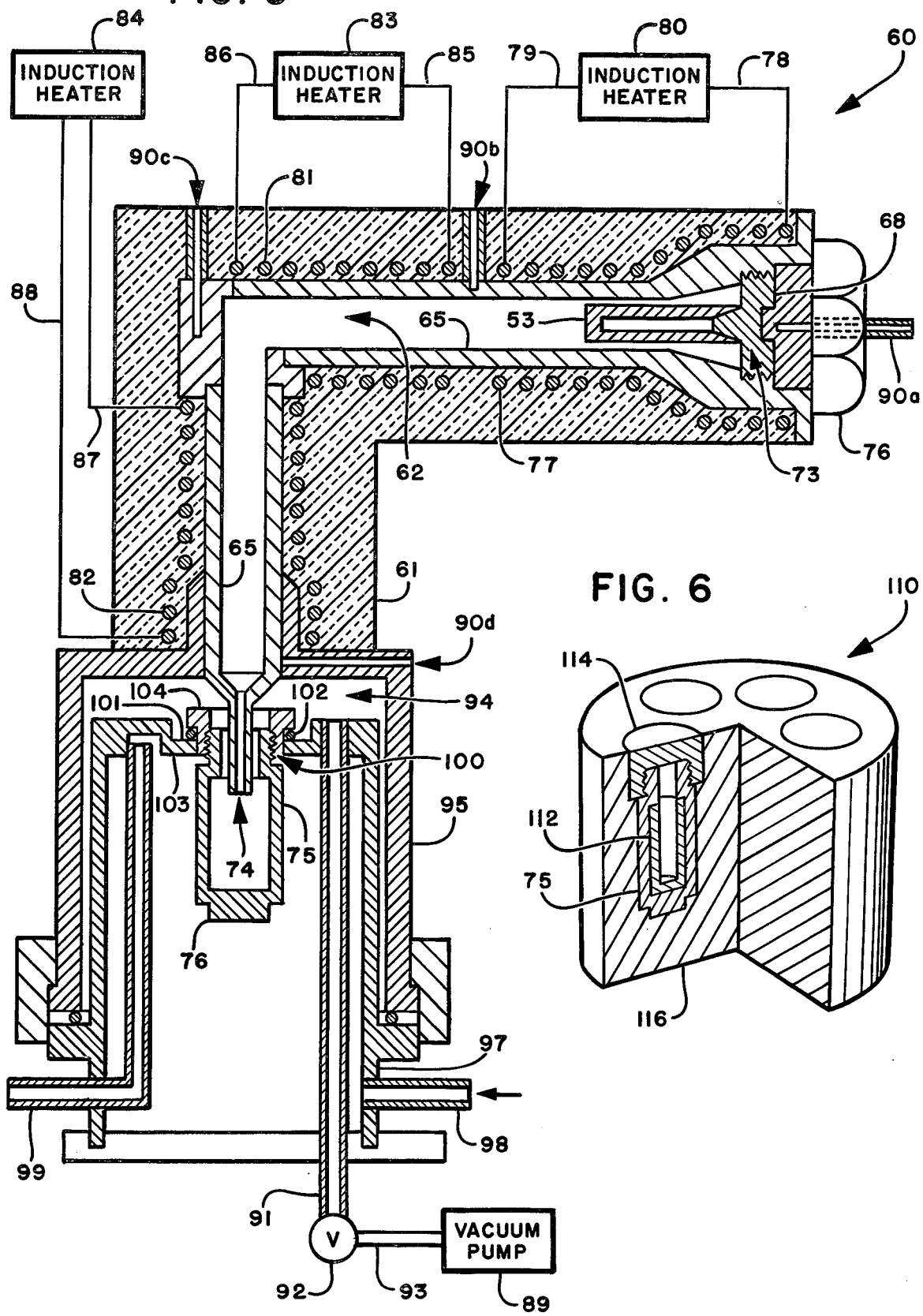

HIGH PURITY POLONIUM RECOVERY

BACKGROUND OF INVENTION

The invention relates to apparatus and method for vapor distilling larger quantities of higher purity polonium and condensing same into a container for a nuclear fuel.

Polonium-210 is normally obtained by the irradiation of bismuth with neutrons in a nuclear reactor according to the following equations:

(1)

(2)

In this process, bismuth may be cast into about 10 kilogram slugs and an aluminum jacket of about 6 millimeter wall thickness may be placed around each slug prior to its being placed into the reactor. Appropriate irradiation cycle for the slugs varies depending upon the neutron flux; from 60 to 300 curies (Ci) of polonium may be produced per kilogram of bismuth.

There are various processes for separating the polonium from the bismuth. One process is such as described in U.S. Pat. No. 3,271,320 entitled "Polonium Recovery". That patent sought to overcome the therein stated problem of vacuum distillation as to ability to vacuum distill on a large scale, and the shielding due to radioactivity of vapors formed. Another method for separating polonium from bismuth involved removing the aluminum from the irradiated slug by dissolution in hydrochloric acid and dissolving the bismuth in aqua regia. Excess nitric acid in this latter reaction was destroyed with formic acid at from about 85° to about 90°C. Polonium was thereafter separated from the bismuth and purified using a series of deposition and redissolution steps concluding with an electrolysis step wherein the polonium could be cathodically deposited on platinum gauze under controlled electrolytic conditions. This other method likewise was somewhat limited to the amount of polonium that could be processed in a given time. Further, the polonium which was deposited on the platinum gauze generally required further purification for use as a radioisotopic fuel.

SUMMARY OF INVENTION

In view of the above described limitations and drawbacks in prior art processes, it is an object of this invention to provide a method and apparatus of forming a polonium product which may be used as a radioisotopic fuel without further processing.

It is a further object of this invention to provide a method and apparatus for larger scale polonium processing.

It is a further object of this invention to provide a method and apparatus for yielding larger quantities of high purity polonium fuel.

Various other objects and advantages will become apparent from the following description of this invention, and the most novel features will be pointed out with particularity hereinafter in connection with the appended claims. It is understood that various changes in the details, materials and apparatus configurations which are herein described and illustrated to better explain the nature of the invention may be made by those skilled in the art without departing from the scope of this invention.

Irradiated polonium (including polonium-210), bismuth and aluminum obtained by the process described in the Background of Invention are dissolved in aqua regia solution and formic acid is then added to this solution in sufficient quantity to react with all of the nitric acid; polonium-210 is concentrated by spontaneous deposition on unirradiated bismuth powder having from about 80 to about 90 mesh particle size while agitating the mixture to achieve greater than about 98% polonium deposition; hydrochloric acid-30% hydrogen peroxide mixture is added to dissolve the polonium coated particles and polonium is precipitated as a metal by the addition of stannous chloride. The reduced polonium is dissolved in about 6 normal (N) nitric acid and concentrated ammonium hydroxide is added to attain a pH of from about 8 to about 9 precipitating polonium hydroxide ($^{210}Po(OH)_4 \cdot xH_2O$), which is immediately cooled and this precipitate filtered and dried in an inert gas atmosphere. The precipitate contained in the filter is placed in the novel apparatus of this invention, and heated to about 900°C while evacuating the apparatus to about $10^{-4}$ torr thereby vaporizing polonium and subsequently condensing polonium vapors in a radioisotopic fuel container.

DESCRIPTION OF DRAWING

FIG. 1 illustrates a flow process suitable for use in this invention.

FIG. 2 graphically illustrates effect of bismuth powder size on polonium deposition rate.

FIG. 3 graphically illustrates effect of polonium concentration on polonium deposition rate.

FIG. 4 is a schematic representation of apparatus suitable for precipitating polonium hydroxide.

FIG. 5 is a schematic representation of a distillation apparatus of this invention.

FIG. 6 is a partially cutaway perspective view of a radioisotopic generator containing the heat source element made of this invention.

DETAILED DESCRIPTION

As shown in FIG. 1, bismuth is exposed to neutron irradiation in a nuclear reactor converting some of the bismuth to polonium in accordance with equations 1 and 2. The bismuth and polonium are dissolved in aqua regia and formic acid is thereafter added to counteract the nitric acid as shown in equation 3 as follows:

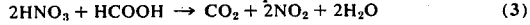

(3)

The solution is maintained at greater than about 9 N in chloride ion concentration in order to remove the silver in the subsequent step wherein bismuth, preferably from the same lot as the material which was irradiated, is added in the form of a powder of from about 80 to about 90 mesh size to provide a reduction and deposition medium for the polonium. The advantage in using bismuth from the same lot is that no new impurities are introduced into the process. Although the mesh size of the bismuth partilces may range from a very low to a very high mesh such as for example from 80 to about 170 mesh, polonium deposition rate is improved when the high mesh powders are used such as from between about 120 to about 170 mesh as shown in FIG. 2. This, however, also increases the number of fines suspended in solution and makes decantation and filtration processes more difficult. Particle sizes larger than about 80 mesh also increase the rate of settling. For these reasons, particle sizes between about 80 and about 90 mesh are preferred.

FIG. 3 illustrates the percent polonium removal from solution wherein polonium concentration is related to the rate of spontaneous deposition as a function of time. The more concentrated the solution is, the more rapidly will the polonium spontaneously deposit per unit of time.

Spontaneous deposition may be conducted in a Pyrex conical container. This container may have openings for introducing the polonium-bismuth chloride solution, bismuth powder charge, an inert gas bubbling tube useful for agitation, and conduits for removal of spent solution and polonium product solution. The cone taper allows the bismuth powder to collect rapidly in a confined volume when agitation is ceased. Spontaneous deposition of the polonium upon the bismuth is enhanced and accelerated due to the thermal heat contribution generated from the polonium-210. Spontaneous deposition yields of polonium greater than about 98% have been achieved by considering the bismuth particle size, the temperature range, the concentration of the polonium, etc. In general, greater than 95% of the polonium may be removed from solution in from 30 to 40 minutes by this process.

The supernatant from the spontaneous deposition may be removed by any suitable process, such as by decanting, and the polonium coated bismuth particles may be dissolved in place if desired, using a concentrated hydrochloric acid-30% hydrogen peroxide mixture. Thereafter a solution of about 10% stannous chloride in hydrochloric acid is added to the solution containing the dissolved polonium coated bismuth particles reducing the polonium to the metal form and the polonium metal is filtered and collected on a suitable filter such as a medium grade glass frit of pore size of from about 10 to about 15 microns, rinsed with stannous chloride and water of from about 0.1 N to about 0.5 N, and the polonium metal is then dissolved in an about 4 to about 8 N nitric acid solution and preferably about 6 N.

FIG. 4 illustrates polonium precipitation and filtering apparatus 10 for reacting the polonium dissolved in the about 6 N nitric acid solution with ammonium hydroxide by adding sufficient ammonium hydroxide to thereby adjust the pH to from about 8 to about 9 and form a gelatinuous polonium hydroxide precipitate $(Po(OH)_4 . xH_2O)$ which is then immediately cooled and filtered using a suitable filtering element or medium such as a filter adaptable to the apparatus shown in FIG. 5 for vacuum distilling the polonium. The filter pore size may be from about 10 to about 20 microns and the filter material may be such as carbon, tantalum, platinum, stainless steel, and the like.

The polonium precipitation and filtering apparatus 10 comprises a housing of flask 12 which may be suitably cooled such as by introducing water as shown by arrow 14 into conduit 16 and passageways in housing 12. Water may be removed as indicated by arrow 18 at water outlet conduit 20. The housing 12 may be suitably sealed by a stopper 24 made of a material such as cork, plastic, rubber, and the like, having passageways therein to accommodate vacuum conduit 26 which is used to evacuate the housing or flask 12 removing the air therein as shown by arrow 28, a solution transfer conduit 30 which uses valve means 32 to regulate solution entering as shown by arrow 34 into conduit 36, and a further conduit 38 used to introduce a suitable reagent such as ammonium hydroxide or the like, the flow of which solution is controlled by valve 40 and which solution enters conduit 44 as shown by arrow 42.

After reaction of the polonium and formation of the hydrated polonium hydroxide, the solution is removed from housing or flask 12 by appropriate adjustment of a suitable valving system such as three-way valve 46 which regulates the flow of solution between housing 12 and conduits 50 and 51. Conduit 50 is suitably attached to a further container (not shown) which is used to receive the solution from housing 12. Conduit 51 is attached, in addition to valve 46, to a housing 52 which generally surrounds a suitable filter material or medium having suitable openings of from about 10 to about 20 microns and preferably such as an about 15 microns pore size stainless steel filter 53.

In a preferred embodiment, filter 53 has a generally centrally disposed passageway, recess, or aperture 54 which allows uniform filtration throughout its length. Disposed in sealing arrangement at a lower end of housing 52 over filter 53 and housing 52 is a cover 55 having a centrally disposed hole or opening 56 generally located over the passageway or recess 54 of filter 53. A conduit 58 is disposed within the hole or opening 56 on said cap 55 and the conduit is attached to suitable vacuum pumps (not shown) such that evacuation may be effected as shown by arrow 59.

The polonium containing nitric acid solution is input by properly adjusting valve 32 to control the flow rate at input flow conduit 30 into housing 12. The system is appropriately evacuated to about 30 inches of mercury. A reagent which may be a suitable base such as from about 10 molar (M) to about 14 M ammonium hydroxide, is introduced as shown by arrow 42 and the rate of flow of the base is controlled by valve 40. Preferably, concentrated ammonium hydroxide is used to effect the formation of polonium hydroxide by reacting with a solution in which the polonium concentration has been adjusted to from about 4 to about 7 curie per milliliter. Sufficient base such as concentrated ammonium hydroxide (i.e., from about 10 Normal to about 15 Normal) is added incrementally to attain a pH of from about 8 to about 9 wherein a gelatinous precipitate of $^{210}Po(OH)_4 . xH_2O$ forms. The amount of concentrated ammonium hydroxide will be from about 350 to about 400 milliliters if the polonium concentration is maintained at from about 4000 to about 7000 curie per liter or about 4 to about 7 curies per milliliter. Immediately upon the formation of a precipitate, that is, in from about 30 to about 60 seconds, cooling water is introduced around the flask through conduit 16 and removed at conduit 20. This sudden cooling causes the polonium hydroxde precipitate to float on the solution surface for about 2 to about 3 minutes. The temperature of the cooling water is preferably from about 5° to about 10°C but ambient temperature water may be used. The phenomenon of flotation enables the achievement of rapid vacuum filtration of the hydroxide so that the majority of the solution may be removed by proper adjustment of valve 46 through conduit 50 prior to the bulk of the polonium precipitate reaching valve 46. At that time, valve 46 is properly switched or adjusted to direct the flow of the precipitate to conduit 51 into housing 52 such that the force of evacuation as shown by arrow 59 may remove the solution through conduit 58 and leave the precipitate on filter element or medium 53. The shape of the filter 53 is such that it is compatible with the purification distillation system as subsequently disclosed.

Table I presents data on seven precipitation-filtration runs. The data relates to polonium input and polonium output so that a filtration yield percentwise is obtained.

TABLE I

PRECIPITATION OF $^{210}$Po FROM NITRATE SOLUTION

| $^{210}$Po Input (Ci) | $^{210}$Po Output (Ci) | Filtration Yield (%) | Neutron Emission After Filtration (n/sec/Ci) |
|---|---|---|---|
| 3251 | 3004 | 92.4 | 1306 |
| 2376 | 2036 | 85.7 | 1511 |
| 4802 | 4544 | 94.6 | 915 |
| 5282 | 4761 | 90.1 | 1047 |
| 2652 | 2526 | 95.2 | 863 |
| 5208 | 4860 | 93.3 | 672 |
| 1578 | 1507 | 95.5 | 1169 |

Following the precipitation and filtration, the filter medium 53 is removed from housing 52 and dried by passage of inert gas flow through the filter medium 53. The inert gas used such as helium or argon may be at a temperature of from about 20°C to about 30°C.

After drying, the filter medium 53 is inserted in a filter medium support 68, as shown in FIG. 5, and disposed within the polonium purification and distillation apparatus 60. The filter medium support 68 may be made of any appropriate material such as tantalum, 90 weight percent tantalum - 10 weight percent tungsten, copper or stainless steel. Polonium purification and distillation apparatus 60 includes a housing 61 which may be made from any suitable heat resistant materials such as heat resistant glass, ceramic, glass ceramics, or the like. Housing 61 contains therein a passageway 62 extending from an input end 73 of said housing 61 in which the filter means support 68 is disposed to an output end 74 wherein, after heating, the polonium settles and is deposited into a receiver or like container 75. Passageway 62 is formed by generally annular wall 65 made of a suitable material such as tantalum, stainless steel, or a heat resistant superalloy. Selection of the material is to be determined by corrosion resistance to polonium, bismuth, impurities, and the atmosphere at about 900°C. Ease of fabrication, availability and cost also effect the selection of the material.

Passageway 62 may be straight, or may be, as illustrated in FIG. 5, at some angle or "dog leg" to prevent impurity material on the filter element 53 from falling into the heat source element 75 as well as to receive the vaporized or liquid polonium in a suitable receiver, container or heat source element 75. Input end 73 of passageway 62, may be closed after disposition of filter means support 68 within said passageway 62 adjacent input end 73 by suitable means such as a cover 76 which may be in threaded engagement with housing 61 to prevent escape of polonium vapors or entrance of other gases.

Filter medium 53 may be heated through any suitable means, for example, as by inductive heating using induction heat coil 77 appropriately connected to induction heater 80 through electrical connectors 78 and 79 or through other heating means such as resistance heating and the like so as to maintain the temperature in the area adjacent the filter medium 53 at from about 700°C to about 900°C and preferably at about 900°C. A temperature gradient is maintained along passageway 62 to obtain a temperature differential of from about 400°C to about 500°C and preferably about 400°C between the input end 73 and the output end 74 of passageway 62. In order to accomplish this, one or more suitable heating means may be disposed adjacent the passageway 62. As shown in FIG. 5, induction coils 81 and 82 are disposed adjacent to and surrounding wall 65 portions of passageway 62. These coils are joined to induction heaters 83 and 84 respectively through electrical conductors 85, 86 and 87, 88 respectively. Heating of the polonium hydroxide to a temperature of about 900°C vaporizes same and, because polonium metal has a high vapor pressure at elevated temperatures, polonium can be displaced from the filter medium 53 to receiver or element 75.

Suitable temperature measuring means such as thermocouples 90a, 90b, 90c, and 90d may be disposed in areas adjacent the input end 73, adjacent the filter means support 68, adjacent the angle of bend in passageway 62 and adjacent the output end 74 respectively.

Prior to heating and during the distillation process, the passageway 62 and chamber 94 formed by condenser 97 walls within outer jacket 95 walls may be evacuated by means of a vacuum pump 89 or the like suitably attached to conduit 93. Fluid passageway to conduit 93 is controlled or regulated by valve 92 attached to conduit 91 which leads to chamber 94 and further communicates with passageway 62 as well as radioisotopic heat source element 75. After evacuation to less than about 10$^{-4}$ torr, heating may be initiated.

Heat source element 75 is cooled by suitable cooling means such as condenser 97 wherein water flows through water inlet conduit 98 and outlet conduit 99. This flow of water cools the upper condenser 97 wall 103 and maintains receiver, container or heat source element 75 at an appropriate polonium condensation temperature such as about 100°C so that polonium condenses within container 75 which may rest within condenser 97 through any suitable means such as shown in FIG. 5 wherein appropriate O-rings 102 are placed in channels 101 to condenser wall 103. A threaded portion 100 extending from the upper portion of element 75 sealingly mates or engages with a threaded portion on coupler ring 104 and wall 103.

Radioisotopic heat source element 75 may be configured so as to include a projection or ledge 76 used to grip the element 75 after it has been loaded with $^{210}$Po and prevent damage to element 75 surface and further enable immediate placement of element 75 within a radioisotopic generator so that the polonium-210 radioisotope may serve as fuel. The quantity, such as from about 0.01 grams to about 10 grams and purity, such as between about 90 and about 99% achievable by this process and apparatus of polonium-210 enable the use of this condensed product immediately as a fuel without any further processing.

FIG. 6 illustrates in a partially cutaway perspective view a radioisotopic generator heat source arrangement 110 utilizing element 75. A plurality of these elements may be used as required. As shown, the heat source element 75 including the deposit of polonium-112 is covered by suitable means such as plug cover 114 which may be screwed or welded onto heat source element 75 and deposited within housing 116 in appropriate cavities or openings. The element 75 is retained in position through suitable means such as plug cover 114 sealingly threaded or welded to housing 116. Housing 116 which is shown primarily for purposes of illustration, may be made of any suitable material such as tantalum, 90 weight percent (w/o) tantalum-10 w/o tungsten, and stainless steel and may include such other materials, liners, walls, etc. as is known in the art.

TABLE II

DISTILLATION DATA FOR $^{210}$Po PURIFICATION

| $^{210}$Po Input (Ci) | $^{210}$Po Output (Ci) | Distillation Yield (%) | Neutron Emission* (n/sec/Ci) | Neutron Emission** (n/sec/Ci) |
|---|---|---|---|---|
| 3290 | 3045 | 92.6 | 1580 | 58 |
| 2746 | 2663 | 97.0 | 1239 | 123 |
| 2758 | 2688 | 97.5 | 1000 | 70 |
| 4544 | 4188 | 92.2 | 915 | 56 |
| 3876 | 3744 | 96.6 | 863 | 86 |
| 4761 | 4184 | 87.9 | 1047 | 70 |
| 4716 | 4440 | 94.1 | 672 | 35 |
| 5890 | 5700 | 96.8 | — | 44 |

*Before distillation
**After distillation

The purity of the polonium distilled as listed in Table II is from about 90 to about 99%. An overall polonium yield of about 75 to 80% may be obtained by vacuum distillation commencing with the input to the spontaneous deposition step described hereinabove. Using this system and apparatus, kilocurie amounts of polonium may be processed on a routine basis. In the distillation of one gram quantities of polonium, transfer efficiencies were about from 85% to about 97%.

Comparison tests between the method and apparatus described herein and the prior art "platinum gauze" electrolysis step described in the Background of Invention has yielded significant advantages using this invention. For example, neutron values achieved ranged from 35 to 125 neutrons/second/curie while platinum gauze electrolysis process values were a factor from 5 to 8 times greater. This indicates that the use of this invention gives a much purer product which may directly load large quantities of $^{210}$Po to heat source elements.

What is claimed is:

1. A method for providing a radioactive heat source element comprising contacting polonium containing polonium-210 with from about 4 to about 8 normal nitric acid to form a nitric acid solution containing from about 4 to about 7 curies of polonium-210 per milliliter of solution, adding a base to said solution to adjust the pH of said solution to from about 8 to about 9pH thereby precipitating polonium hydroxide having the formula Po(OH)$_4$ . xH$_2$O, immediately cooling said solution and said precipitate, filtering said cooled precipitate within from about 2 to about 3 minutes in from about 10 to about 20 micron filter element, passing a heated inert gas through said filter element thereby drying said precipitate, heating said filter element to about 900°C in a vacuum of less than about 10$^{-4}$ Torr to vaporize said polonium, and thereafter condensing said vaporized polonium in a heat source element.

2. The method of claim 1 wherein said base is from about 10 normal to about 15 normal ammonium hydroxide.

3. The method of claim 1 wherein said filter element material is selected from the group consisting of carbon, tantalum, platinum and stainless steel.

4. The method of claim 1 wherein said inert gas is taken from the group consisting of helium and argon at a temperature of from about 20°C to about 30°C.

* * * * *